United States Patent
Mueller (10) Patent No.: US 11,764,538 B2
(45) Date of Patent: Sep. 19, 2023

(54) METHOD FOR ADJUSTING A LASER BEAM, APPARATUS FOR PROVIDING AN ADJUSTED LASER BEAM AND OPTICAL ARRANGEMENT

(71) Applicant: TRUMPF Lasersystems for Semiconductor Manufacturing GmbH, Ditzingen (DE)

(72) Inventor: Jonathan Mueller, Stuttgart (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 86 days.

(21) Appl. No.: 17/478,975

(22) Filed: Sep. 20, 2021

(65) Prior Publication Data
US 2022/0006254 A1    Jan. 6, 2022

Related U.S. Application Data

(63) Continuation of application No. PCT/EP2019/056929, filed on Mar. 20, 2019.

(51) Int. Cl.
| | |
|---|---|
| *H01S 3/13* | (2006.01) |
| *H01S 3/10* | (2006.01) |
| *H01S 3/00* | (2006.01) |
| *H01S 3/106* | (2006.01) |
| *H01S 3/16* | (2006.01) |

(Continued)

(52) U.S. Cl.
CPC .......... *H01S 3/10015* (2013.01); *H01S 3/005* (2013.01); *H01S 3/0071* (2013.01); *H01S 3/106* (2013.01); *H01S 3/10023* (2013.01); *H01S 3/16* (2013.01); *H01S 3/225* (2013.01); *H01S 3/2232* (2013.01)

(58) Field of Classification Search
CPC .... H01S 3/10015; H01S 3/005; H01S 3/0071; H01S 3/10023; H01S 3/106; H01S 3/16; H01S 3/2232; H01S 3/225
See application file for complete search history.

(56) References Cited

U.S. PATENT DOCUMENTS

| | | | |
|---|---|---|---|
| 2010/0078577 A1 | 4/2010 | Moriya et al. | |
| 2013/0064258 A1* | 3/2013 | Fujimoto | ............ H01S 3/08004 372/38.1 |

(Continued)

FOREIGN PATENT DOCUMENTS

| | | |
|---|---|---|
| DE | 102015215645 A1 | 2/2017 |
| TW | 201628751 A | 8/2016 |
| WO | WO 2019048657 A1 | 3/2019 |

*Primary Examiner* — Kinam Park (74) *Attorney, Agent, or Firm* — LEYDIG VOIT & MAYER LTD.

(57) ABSTRACT

A method for adjusting a laser beam includes, following passage of the laser beam through a beam-shaping device, measuring, via a detector of a detector device, a beam profile of the laser beam. The method further includes determining a beam quality property of the laser beam based on the measured beam profile and altering an adjustable optical unit for modifying at least one property of the laser beam prior to the entry into the beam-shaping device. For adjusting the laser beam, the adjustable optical unit is altered based on the determined beam quality property.

18 Claims, 2 Drawing Sheets

(51) Int. Cl.
*H01S 3/223* (2006.01)
*H01S 3/225* (2006.01)

(56) References Cited

U.S. PATENT DOCUMENTS

| | | | |
|---|---|---|---|
| 2013/0146569 A1* | 6/2013 | Woods | B23K 26/20 |
| | | | 219/121.72 |
| 2014/0374605 A1* | 12/2014 | Mizoguchi | H01S 3/1305 |
| | | | 250/354.1 |
| 2015/0377207 A1* | 12/2015 | Ridderbusch | F02P 23/04 |
| | | | 123/143 B |
| 2016/0327802 A1* | 11/2016 | Bethel | G02B 6/0096 |
| 2017/0329147 A1* | 11/2017 | Deutsch | G02B 27/1006 |
| 2017/0355635 A1 | 12/2017 | Li | |
| 2018/0185965 A1 | 7/2018 | Victor et al. | |
| 2018/0375278 A1* | 12/2018 | Brunne | H01S 3/0064 |
| 2020/0379281 A1* | 12/2020 | Erhard | H01S 3/0064 |

* cited by examiner

METHOD FOR ADJUSTING A LASER BEAM, APPARATUS FOR PROVIDING AN ADJUSTED LASER BEAM AND OPTICAL ARRANGEMENT

CROSS REFERENCE TO RELATED APPLICATIONS

This application is a continuation of International Application No. PCT/EP2019/056929 (WO 2020/187405 A1), filed on Mar. 20, 2019. The aforementioned applications are hereby incorporated by reference herein.

FIELD

The present disclosure relates to a method for adjusting a laser beam, an apparatus for providing an adjusted laser beam and an optical arrangement, in particular an extreme ultraviolet (EUV) radiation generation apparatus.

BACKGROUND

During the passage of the laser beam through a beam-shaping device, i.e., a device that modifies at least one optical property of the laser beam, the beam quality of said laser beam is typically also influenced (generally made poorer). Therefore, when a laser beam that passes through such a beam-shaping device is adjusted, a multiplicity of optical boundary conditions and disturbing factors in the beam-shaping device can lead to the adjustment of the laser beam to design parameters only supplying an insufficient beam quality of the laser beam emanating from the beam-shaping device. Therefore, as a rule, such beam-shaping devices are optimized empirically, i.e., only qualitative criteria are applied to the adjustment since quantitative criteria are not available, for obtaining a good beam quality. As a result of this, the adjustment can only be performed by experts and is only reproducible with difficulties.

US 2013/0146569 A1 has disclosed a method for adjusting a laser beam, which acts on a workpiece during a processing procedure. A laser processing system receives the laser beam, which has assigned a beam quality property, and adjusts said laser beam in such a way that the beam quality property is modified on the basis of a property of the workpiece, a property of the processing process or a combination of both. By way of example, the beam quality property can be the M squared parameter ($M^2$ value) of the laser beam or the beam parameter product.

SUMMARY

In an embodiment, the present disclosure provides a method for adjusting a laser beam. The method includes, following passage of the laser beam through a beam-shaping device, measuring, via a detector of a detector device, a beam profile of the laser beam. The method further includes determining a beam quality property of the laser beam based on the measured beam profile and altering an adjustable optical unit for modifying at least one property of the laser beam prior to the entry into the beam-shaping device. For adjusting the laser beam, the adjustable optical unit is altered based on the determined beam quality property.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 a shows a schematic illustration of the two-dimensional intensity distribution of the laser beam as measured by the spatially resolving detector;

DETAILED DESCRIPTION

The present disclosure provides a method for adjusting a laser beam, an apparatus for providing an adjusted laser beam and an optical arrangement, which facilitate an adjustment on the basis of an objective beam quality property.

One aspect of the present disclosure relates to a method for adjusting a laser beam, comprising: measuring a beam profile of the laser beam, following the passage thereof through a beam-shaping device, by means of at least one detector, preferably a spatially resolving detector, of a detector device, determining a beam quality property of the laser beam on the basis of the measured beam profile, and altering an adjustable optical unit for modifying at least one property of the laser beam prior to the entry into the beam-shaping device, wherein, for adjusting the laser beam, the adjustable optical unit is altered, in particular a plurality of times, on the basis of the determined beam quality property, preferably until the beam quality property reaches a specified value.

The present disclosure proposes to optimize the beam quality of the laser beam passing through the beam-shaping device by virtue of the beam profile of the laser beam being measured following the passage through the beam-shaping device and a beam quality property—an objective or unique beam quality property—of the laser beam being determined on the basis of the measured beam profile. An alterable optical unit is disposed upstream of the beam-shaping device, the laser beam passing through said optical unit and said optical unit being altered on the basis of the determined beam quality property or the value of the beam quality property determined in each case for optimizing the beam quality. This allows subjective criteria for the adjustment to be dispensed with, without knowing the disturbance effects that occur in the beam-shaping device in any more detail.

Determining a beam position and/or propagation angle of the laser beam with the aid of a detector, e.g., with the aid of a quadrant detector, or with the aid of a camera and acting on an actuating device, e.g., in the form of an adjustable optical unit, in order to stabilize the beam position and the propagation angle are known as a matter of principle. However, such an adjustment is not based on the optimization of the beam quality but only on a direct feedback signal, e.g., an offset on the detector, which allows minimization of the deviation between an actual value and the target value.

However, a direct relationship between an actual value and a target value is not, as a rule, provided during the passage through a beam-shaping device or this relationship is very complex. By contrast, there can be an adjustment with the aid of the beam quality property as an objective criterion without precise knowledge of the disturbance effects occurring in the beam-shaping device. Therefore, the beam-shaping device can be considered to be a "black box" for the adjustment.

The alteration of the adjustable optical unit is typically implemented in automated fashion with the aid of an optimization algorithm, which is implemented in suitable software and/or hardware and which supplies a control signal for driving the adjustable optical unit or actuators provided to this end. Typically, the optimization is carried out until the specified value of the beam quality property, and hence the adjustment target, or a termination criterion is reached.

Alternatively, the adjustable optical unit could be altered manually by an operator for the adjustment. Providing the operator with operating instructions relating to how the adjustable optical unit should be modified on the basis of the value of the beam quality property determined in each case is advantageous here. If the adjustable optical unit offers more than one adjustment option for optimizing the beam quality property, the manual alteration or optimization is only implementable with difficulties in practice as this necessarily leads to comparatively complex operating instructions.

In one variant, the beam quality property is maximized or minimized by altering the adjustable optical unit. As described further above, the adjustable optical unit is not, as a rule, altered arbitrarily; instead, there is directed alteration of the optical unit on the basis of an optimization algorithm. Here, the adjustment is carried out, as a rule, in a plurality of adjustment or alteration steps, in which there is a respective action on the adjustable optical unit in order to gradually modify (at least) one property of the laser beam. The decision about the degree/the direction of the alteration and—in the case of a plurality of alteration options—the selection of a suitable operation option in the next adjustment step can be implemented by means of an optimization algorithm, for example by means of a gradient method or the like. The adjustment is terminated once the adjustment target has been reached, i.e., once the beam quality property reaches the specified value during the maximization or minimization, or once a termination criterion, for example a specified number of adjustment steps, has been reached.

In an advantageous variant, a deviation of the beam profile from a specified beam profile, in particular from a Gaussian beam profile, is determined as beam quality property. To this end, at least one image or an intensity distribution of the laser beam in at least one plane, which is typically perpendicular to the propagation direction of the laser beam, is typically recorded by means of the detector, e.g., in the form of a spatially resolving camera. In the simplest case, the beam profile is a single image or intensity distribution of the laser beam in a plane perpendicular to the propagation direction. Alternatively, the beam profile can be a beam caustic in the propagation direction of the laser beam. For determining the beam profile in this case, a plurality of images are generally recorded in a plurality of planes that are offset in the propagation direction of the laser beam.

In an advantageous development, a deviation of an intensity distribution of the laser beam on the detector from a specified intensity distribution, in particular from a Gaussian intensity distribution, is determined as beam quality property. In this case, the beam profile is measured by virtue of recording a single image or a single two-dimensional intensity distribution on the detector. The beam quality property is determined by virtue of the intensity distribution being compared to a specified two-dimensional intensity distribution, e.g. a two-dimensional Gaussian intensity distribution. As a rule, it is not an image or a (two-dimensional) intensity distribution that is used as specified intensity distribution; instead, the specified intensity distribution is described with the aid of (geometric) parameters. In addition to a Gaussian intensity distribution, which is rotationally symmetric in relation to the beam centroid or the beam center of the laser beam, other, non-rotationally symmetric intensity distributions can also be used for the comparison. This is advantageous if the beam profile of the laser beam deviates from a rotationally symmetric intensity distribution, for example because the laser beam has an elliptical beam profile.

By way of example, a (two-dimensional) Gaussian intensity distribution $I_G(x, y)$ can be described by the following formula:

$$I_G(x, y) = I_0 \ \text{EXP}([(x-x_0)2 + (y-y_0)^2]/(2w_0^2)), \quad (1)$$

where $I_0$, $x_0$, $y_0$, $w_0$ form the parameters of the Gaussian intensity distribution.

The deviation D of the detected intensity distribution $I(x, y)$ from the Gaussian intensity distribution $I_G(x, y)$ can be expressed, for example, by the following error integral:

$$D = \iint_{x,y} (I(x, y) - I_G(x, y))^2 \quad (2)$$

The deviation in the form of the error function D is determined numerically and minimized during the adjustment.

In one development, at least one parameter of the specified intensity distribution is varied when determining the deviation. In principle, there can be an (independent) variation of one or more of the parameters $I_0$, $x_0$, $y_0$, $w_0$ of the Gaussian intensity distribution, which were defined in the description above, when determining the deviation D or the one or more parameters can be predefined. The decision whether a certain parameter is varied or predefined is made on the basis of the desired properties of the laser beam. By way of example, the center position $x_0$, $y_0$ and the maximum intensity $I_0$ of the Gaussian intensity distribution can be varied or chosen freely, while the dimension for the beam diameter $w_0$ is predefined.

It is understood that, depending on the respective application, other fit or error functions (1) and (2) are also possible for the numerical determination of the deviation D. By way of example, in the case of a laser beam with a non-rotationally symmetric intensity distribution, e.g., an elliptical intensity distribution, there can be different weightings in the two axis directions of the ellipse on the basis of the distance from the beam centroid for determining the deviation D. Furthermore, the detected intensity distribution, for example, can be corrected, for example by subtracting a calibrated background image, or individual regions of the intensity distribution can be weighted differently in the error function, in accordance with the impact thereof on the actual application.

In a further variant, a beam parameter product or an M squared parameter is determined as beam quality property.

For this purpose, the beam profile typically has to be determined, at least approximately, in the form of the beam caustic of the laser beam. To this end, the intensity distribution of the laser beam is measured, as a rule, in a plurality of mutually spaced apart planes, for which the detector can be displaced along the propagation direction of the laser beam. As an alternative or in addition thereto, a plurality of images or intensity distributions, which are disposed at fixed distances from one another, can be recorded on a plurality of detectors. The beam caustic can be used to determine the M squared parameter ($M^2$ value) of the laser beam, i.e., the ratio between the divergence angle $\varphi$ of the laser beam and the divergence angle $\varphi_G$ of an ideal Gaussian beam with the same diameter the beam waist ($M^2 = \varphi/\varphi_G$). The beam parameter product $BPP = M^2 \lambda/\pi$ can also be determined in this way if the laser wavelength $\lambda$ is known. In the ideal case, there can be an ISO-conform caustic measurement of the laser beam to this end.

Other (objective) beam quality properties can also be used for the adjustment as an alternative to the beam quality properties described further above. Additionally, the beam quality properties described further above can also be suitably modified depending on the respective application; by way of example, the marginal field of the laser beam need not be taken into account if this is not important for the further propagation of the laser beam.

In a further variant, a beam position of the laser beam, an alignment of the laser beam, a caustic of the laser beam and/or an imaging aberration of the laser beam is/are set wherein altering the adjustable optical unit. The beam position of the laser beam is understood to mean a position in a plane perpendicular to the propagation direction of the laser beam upon entry into the beam-shaping device. The alignment of the laser beam is understood to mean an entrance angle when the laser beam enters the beam-shaping device. The caustic of the laser beam is understood to mean an aperture angle (divergence or convergence angle) of the laser beam and the diameter of the laser beam. The imaging aberration which is modified by means of the adjustable optical unit can be the astigmatism, for example, which can be influenced in the adjustable optical unit, e.g., with the aid of cylindrical lenses or the like.

In one variant, at least one optical element, in particular at least one mirror and/or at least one lens, of the adjustable optical unit is/are altered when adjusting the laser beam. The adjustable optical unit may have one or more adjustable (plane) mirrors. As a rule, the alteration is implemented by tilting the mirror or mirrors about a respective tilt axis or axis of rotation in this case, as a result of which the beam position and/or the alignment of the laser beam can be set. The adjustable optical unit could also have one or more alterable lenses, e.g. spherical lenses or cylindrical lenses. In this case, setting is implemented, as a rule, by displacing the respective lens along the beam axis or the propagation direction of the laser beam. The caustic of the laser beam, in particular, can be set in this way. Where necessary, the astigmatism of the laser beam can also be set in the case of cylindrical lenses.

In a further variant, the beam-shaping device is selected from the group comprising: optical amplifier, optical isolator, optical modulator, optical retardation section, optical polarizer. By way of example, the beam shaping device may have one or more apertures, an inhomogeneous optical gain or absorption, optical elements reflecting in nonplanar fashion, etc., which generate distortion effects upon the passage of the laser beam that cannot be calculated deterministically or can only be calculated with great outlay. By way of example, the beam shaping device can be an optical amplifier, an optical isolator, for example a Faraday rotator, an optical (intensity) modulator, for example an electro-optic or acousto-optic modulator, an optical retardation section, for example a multi-pass retardation section, an optical polarizer, for example a beam splitter plate installed at the Brewster angle, etc.

In a further variant, the beam-shaping device, in particular in the form of an optical modulator, and the adjustable optical unit are disposed in a laser resonator. The laser resonator additionally has a laser-active medium and, as a rule, two resonator mirrors, between which a resonator section is formed. One or both resonator mirrors can be part of the adjustable optical unit and can be displaced or tilted, for example, in order to carry out the adjustment. In particular, the laser resonator can be a seed laser for generating a pulsed seed laser beam, which is amplified in one or more optical amplifiers. As a rule, the optical modulator within the laser resonator is used to generate pulses.

Naturally, the beam-shaping device could also be disposed in the beam path outside of a laser resonator. By way of example, this could be an optical amplifier or an amplifier stage, the laser beam being supplied thereto from a (seed) laser source, a preceding amplifier stage, etc.

In one variant, the (entire) laser beam is aligned on the (at least one) detector (only) during the adjustment or a power portion of the laser beam is permanently steered onto the (at least one) detector.

In the first case, use is typically made of a switchable optical element, for example in the way of a tilt mirror, which can be introduced into and removed from the beam path of the laser beam in order to direct the laser beam onto the detector for adjustment purposes or supply the laser beam to an application. In this case, the beam path of the laser beam can be switched between a measurement beam path for the adjustment and the used beam path for using the (adjusted) laser beam, following the passage through the beam-shaping device. By way of example, a (further) optical amplifier stage can be disposed in the use beam path or—in the case of an EUV radiation generation apparatus—a target material, for example, can be disposed therein, in particular in the form of a tin droplet, on which the laser beam is focused.

In the second case, a (typically low) power portion of the laser beam is permanently coupled out of the (used) beam path of the laser beam. By way of example, an output coupling device in the form of a beam splitter device can serve this purpose. This is particularly advantageous if the laser beam should be deflected onto the detector within the laser resonator. Permanent output coupling allows the laser beam to be adjusted during the ongoing operation of an optical arrangement, in which the beam-shaping device is disposed. However, this case generally requires that the adjustable optical unit is only slightly altered during a respective adjustment step in order to avoid the respective application being involuntarily affected during the adjustment.

A further aspect of the present disclosure relates to an apparatus for providing an adjusted laser beam, comprising: a beam-shaping device, a detector device comprising at least one detector, preferably a spatially resolving detector, for measuring a beam profile of the laser beam following the passage through the beam-influencing device, an evaluation device for determining a beam quality property of the laser beam on the basis of the measured beam profile, and an adjustable optical unit for modifying at least one property of the laser beam prior to the entry into the beam-shaping device, wherein, for adjusting the laser beam, the evaluation device is embodied to alter the adjustable optical unit, in particular a plurality of times, on the basis of the determined beam quality property, preferably until the beam quality property reaches a specified value.

As described further above, the manual adjustment of a laser beam which passes through beam-shaping device that changes the optical properties of the laser beam, possibly in a non-deterministic fashion, generally can only be carried out by an expert and is hard to reproduce. The above-described apparatus for providing a laser beam facilitates an automatic adjustment of the laser beam which passes through the beam-shaping device. Therefore, the beam-shaping device is provided with an automated adjustment unit which independently undertakes the adjustment without a user having to intervene in the adjustment process.

In one embodiment, the beam-shaping device is selected from the group comprising: optical amplifier, optical isolator, optical modulator and optical retardation section, optical polarizer. As described further above, non-deterministic distortion effects, in particular, may occur in these devices, exact knowledge of said distortion effects not being necessary for the adjustment described here.

In a further embodiment, the adjustable optical unit has at least one alterable optical element, in particular at least one alterable lens and/or at least one alterable mirror, for modifying the at least one property of the laser beam. For altering the at least one optical element (in automated fashion), use is typically made of at least one actuator or motor drive. The evaluation device, which is realized in suitable software and/or hardware, for example in the form of a computer program, a programmable component, e.g., in the form of an FPGA, etc., generates a control signal for driving the actuator or the motor drive in order to bring about the alteration of the at least one optical element. By way of example, the actuator can be embodied to displace and/or rotate the optical element. To this end, a respective holder for the optical element can be embodied to be displaceable and/or rotatable by means of the actuator. The actuator can also act on the optical element in order to modify the geometry thereof, for example in order to modify the radius of curvature of a lens or a mirror. In particular, the adjustable optical unit can have two optical elements that form a beam telescope, i.e., which are disposed at a distance from one another that substantially corresponds to the focal lengths, with one or both of the optical elements being displaceable along the beam axis of the laser beam.

In a further embodiment, the beam-shaping device, in particular in the form of an optical modulator, and the adjustable optical unit are disposed in a laser resonator, which additionally has a laser-active medium. In this case, the apparatus for providing the adjusted laser beam typically forms a laser source, in particular a seed laser source, for generating an adjusted (seed) laser beam. In this case, the beam-shaping device can be, e.g., an electro-optic modulator or an acousto-optic modulator, etc., which can be used for generating ultrashort pulses, for example. For generating the pulse, the laser resonator can be operated with, e.g., (conventional) Q-switching or cavity dumping.

In a further embodiment, the apparatus, more precisely the detector device, comprises a switchable optical element for aligning the laser beam on the detector (only) during the adjustment and/or a beam splitter device for (permanently) steering a power portion of the laser beam onto the detector. As described further above, the beam path of the laser beam is switched with the aid of the switchable optical element between a used beam path and a measurement beam path in the first case. In the second case, a small power portion of the laser beam, as a rule, is coupled out of the use beam path by means of the beam splitter device and supplied to the detector.

The evaluation device can be embodied to maximize or minimize the beam quality property when altering the adjustable optical unit. As described further above in the context of the method, an optimization algorithm can be carried out in the evaluation unit for this purpose, said optimization algorithm controlling the alteration of the adjustable optical unit on the basis of the beam quality property.

In a further embodiment, the evaluation unit is embodied to determine a deviation of the beam profile from a specified beam profile, in particular from a Gaussian beam profile, as beam quality property. As described further above in the context of the method, this can provide a unique criterion for the beam quality of the laser beam.

In one development, the evaluation unit is embodied to determine a deviation of an intensity distribution of the laser beam on the detector from a specified intensity distribution, in particular from a Gaussian intensity distribution, as beam quality property. In particular, the evaluation device can be embodied to vary at least one parameter of the specified intensity distribution when determining the deviation. The numerically determined deviation of the intensity distribution from a Gaussian intensity distribution represents a particularly simple criterion for the beam quality of the laser beam. Recording a single image of the intensity distribution of the laser beam with the aid of a detector, for example in the form of a camera, is sufficient in this case for determining the beam quality property.

The evaluation device can be embodied to determine a beam parameter product or an M squared parameter of the laser beam as beam quality property. In this case, the beam profile is measured in the form of the caustic of the laser beam along its propagation direction or beam direction. In this case, the detector (e.g., a camera) generally is embodied to be displaceable in the propagation direction of the laser beam in order to be able to determine the intensity distribution of the laser beam in a plurality of mutually offset planes. The apparatus could also have two or more detectors that are spaced apart in the beam direction of the laser beam in order to determine the intensity distribution in a plurality of mutually offset planes. In particular, the determination of the beam parameter product and/or the M squared parameter can be implemented in the form of an ISO-conform caustic measurement.

A further aspect of the present disclosure relates to an optical arrangement, in particular in EUV radiation generation apparatus, comprising: at least two apparatuses which are embodied as described further above and which are preferably disposed in succession in the beam path of the laser beam. In this case, where two or more apparatuses are passed successively (sequentially or in a chain) by the laser beam, each apparatus can be adjusted on its own, i.e., individually. If, in a chain of apparatuses or beam-shaping devices, for example in the form of optical amplifiers or amplifier stages, an amplifier which is disposed at the start of the chain, for example, fails or needs repair, it is generally necessary to readjust the complete chain, i.e., all subsequent amplifiers, which leads to a great loss of time. In the optical arrangement described here, this can be remedied by virtue of at least the critical beam-shaping devices being equipped with the automated adjustment function described further above. To this end, it is necessary to embody an optical unit, which may already be present, to be adjustable by the respective beam-shaping device and to dispose a detection device with at least one detector downstream of the respective beam-shaping device. The evaluation unit connected to the detector for determining the beam quality property can be integrated into the optical arrangement, for example in a machine controller present there; this also facilitates driving of the adjustable optical unit. In the ideal case, all mechanical actions for the adjustment of these apparatuses are dispensed with in this way. In particular, the adjustment can be carried out as a regular automated adjustment with predefined adjustment cycles; alternatively, it can be carried out when a set performance criterion, such as, e.g., optical transmission/gain, optical beam quality, etc., of the optical arrangement is undershot or overshot.

Should there be no integration in the machine control, the evaluation device can optionally be installed or run on a mobile computer (laptop), which is signal-connected to the respective detector and, optionally, the adjustable optical unit. This case also allows an inexperienced operator to carry out the adjustment independently. By determining the objective beam quality property, the operator is assisted during the adjustment, possibly carried out manually, by way of the alteration of the adjustable optical unit such that the critical adjustment steps, in particular, can be significantly accelerated.

In particular, the optical arrangement can be an EUV generation apparatus for generating EUV radiation. Typically, such an EUV radiation generation apparatus comprises a vacuum chamber, in which a target material, e.g., in the form of tin droplets, is introducible in a target region for generating EUV radiation. The EUV radiation generation apparatus has a beam guiding device for guiding (at least) one laser beam into the target region in order to convert the target material into the plasma state and generate the EUV radiation in the process. As a rule, the EUV radiation generation apparatus has a seed laser source for generating a pulsed seed laser beam, which is amplified in a plurality of optical amplifiers (in a plurality of amplifier stages) before the laser beam is focused in the target region by means of a focusing device. As a rule, a plurality of beam-shaping devices are present in such a EUV radiation generation apparatus, for example present in the form of a seed laser source or an optical modulator disposed there, in the form of one or more optical amplifiers (coaxial amplifiers or power amplifiers) and optionally in the form of an optical isolator, e.g., in the form of Faraday rotator.

Further advantages of the subject matter of the present disclosure are apparent from the description and the drawing. The aforementioned features and the features mentioned further below can likewise be employed in each case by themselves or in any desired combination. The embodiments shown and described should not be understood to be an exhaustive list, but rather merely illustrative of the present invention.

In the following description of the drawings, identical reference signs are used for the same components or for components having the same function.

Figure 1:
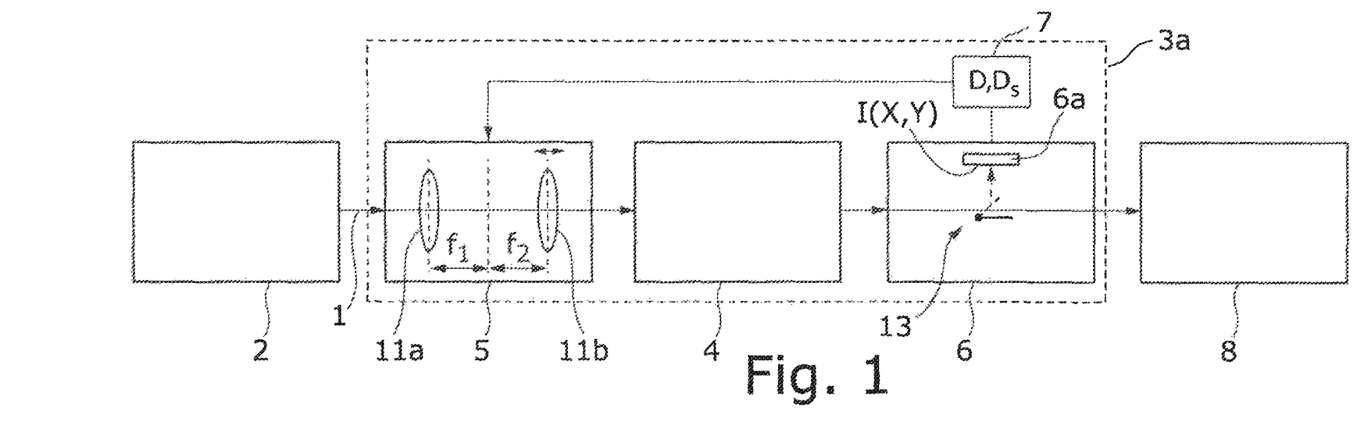
FIG. 1 shows a block diagram of an apparatus for providing an adjusted laser beam with a beam-shaping device in the form of an optical amplifier, an adjustable optical unit and a spatially resolving detector.

FIG. 1 shows a block diagram with five blocks or optical modules, which are successively passed by a laser beam 1. The first of block forms a beam source 2 for providing the laser beam 1 with defined optical properties or with a specified beam quality. By way of example, the beam source 2 can be a laser source or any other optical module that provides a laser beam 1 with a specified beam quality. The second, third and fourth block together form an apparatus 3a for providing an adjusted laser beam 1. The apparatus 3a comprises a beam-shaping device 4 in the form of an optical amplifier. By way of an inhomogeneous gain, for example, the optical amplifier 4 generates distortion effects which influence the beam quality of the laser beam 1, more precisely cause a deterioration therein. In order to adjust the laser beam 1 so that the latter emerges from the apparatus 3a with the desired beam quality, an adjustable optical unit 5 is disposed upstream of the optical amplifier 4 and a detector device 6 is disposed downstream of the optical amplifier 4, said detector device being signal-connected to an evaluation device 7. The adjusted laser beam 1 emerging from the apparatus 3a is supplied to the fifth block, which is a further beam-shaping device 8 in the form of a further optical amplifier in the shown example.

Figure 2:
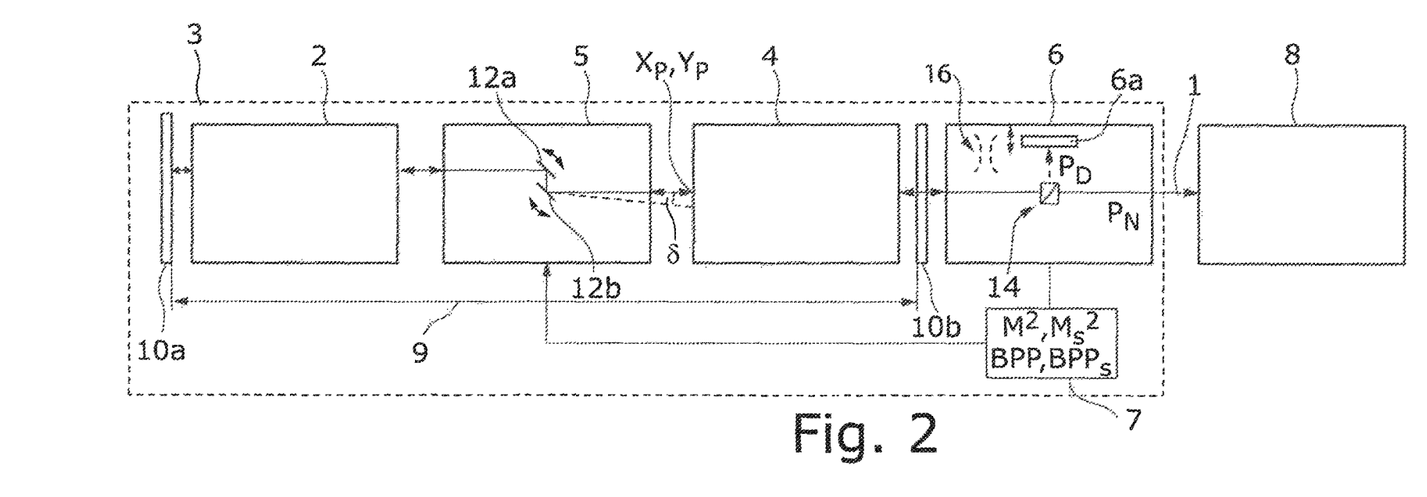
FIG. 2 shows a block diagram analogous to FIG. 1 with a beam-shaping device in the form of an electro-optic modulator that is disposed in a laser resonator.

FIG. 2 shows a block diagram that substantially differs from the block diagram shown in FIG. 1 in that the first block is a laser-active medium 2, which is disposed in a laser resonator 9. The laser resonator 9 is delimited by two end mirrors 10a,b, the second end mirror 10b of which is partially transmissive such that the latter forms an output coupling mirror for coupling the laser beam 1 out of the laser resonator 9. Alternatively, the laser beam 1 can also be coupled out of the laser resonator 9 at a (polarization) beam splitter. This is often the case if a beam-shaping device in the form of an optical modulator 4, for example on electro-optic modulator or an acousto-optic modulator, is disposed in the laser resonator 9 for generating ultrashort laser pulses, as is the case in FIG. 2. As may likewise be identified in FIG. 2, the adjustable optical unit 5 of the apparatus 3 is also disposed within the laser resonator 9 while the detection device 6 is disposed outside of the laser resonator 9. However, the latter is not mandatory, i.e., the detection device 6 can also be disposed within the laser resonator 9.

In the example shown in FIG. 2, the apparatus 3 for providing the adjusted laser beam 1 comprises the laser resonator 9, the first four blocks of the block diagram, i.e., also the laser active medium 2, and the evaluation device 7. Consequently, the apparatus 3 forms a (seed) laser source for providing a pulsed (seed) laser beam 1. It is understood that the arrangement of the laser active medium 2, the adjustable optical unit 5 and the beam-shaping device 4 within the laser resonator 9 is as desired as a matter of principle. In particular, the laser active medium 2 can be a solid or a gaseous laser active medium.

The adjustable optical unit 5 has at least one alterable optical element and can be embodied in different ways. In the block diagram illustrated in FIG. 1, the adjustable optical unit 5 comprises two transmitting optical elements in the form of lenses 11a,b, which form a beam telescope and which (nominally) are disposed at a distance of their focal lengths $f_1$, $f_2$ from one another. In the example illustrated in FIG. 1, this relates to spherical lenses 11a,b, the second lens 11b of which is displaceable along the beam path or along the propagation direction of the laser beam 1. A motor drive, indicated by double-headed arrow in FIG. 1, is used to displace the second lens 11b. In addition or as an alternative thereto, the first lens 11a in the beam path can have an alterable, in particular displaceable, embodiment and/or both lenses 11a,b can be displaced along the propagation direction of the laser beam 1. This displacement of the second lens 11b can influence the caustic of the laser beam 1; i.e., a (slightly) convergent or divergent laser beam 1 can be generated from a collimated laser beam 1. Further properties of the laser beam 1 can be influenced if use is made of aspherical lenses or of cylindrical lenses. By way of example, optical aberrations, e.g., an astigmatism, can be produced or corrected in a targeted manner with the aid of displaceable cylindrical lenses.

In the illustration of FIG. 2, the adjustable optical unit 5 has two deflection mirrors 12a,b, both of which have an alterable embodiment and both of which can be rotated, in each case about an axis of rotation extending perpendicular to the plane of the drawing by means of a respective motor rotational drive, the latter being indicated by double-head arrow in FIG. 2. If only the second deflection mirror 12b is tilted, an angle of incidence δ of the laser beam 1 upon entry into the beam-shaping device 4 can be set. In the process, a beam position $X_P$, $Y_P$ of the laser beam 1 upon entry into the beam-shaping device 4 is also modified. If both deflection mirrors 12a,b are tilted in a suitable fashion, it is possible to generate a parallel displacement of the laser beam 1 in order to set the beam position $X_P$, $Y_P$ upon entry into the beam-shaping device 4 independently of the entry angle δ of the laser beam 1.

The detector device 6 shown in FIG. 1 and FIG. 2 has a spatially resolving detector 6a in the form of a camera, which is signal-connected to the evaluation device 7. The detector device 6 shown in FIG. 1 has a switchable optical element in the form of a tiltable deflection mirror 13, which is tiltable by means of a motor drive from the position shown in FIG. 1, in which said deflection mirror 13 is disposed outside of the beam path of the laser beam 1, into a position indicated by dashed lines in FIG. 1, in which the deflection mirror 13 is disposed in the beam path of the laser beam 1 and aligns the laser beam 1 on the detector 6a during the adjustment.

The detector device 6 illustrated in FIG. 2 differs from the detector device 6 illustrated in FIG. 1 substantially in that, in place of the switchable device 13, a beam splitter device 14 is provided for (permanent) alignment of the laser beam 1 on the detector 6a. In the shown example, the beam splitter device 14 is embodied as a polarization beam splitter and allows a specified power portion $P_D$ (e.g., <1%) of the laser beam 1 to be aligned on the detector 6a while a significantly greater power portion $P_N$ is available as used power at the output of the (adjusted) laser beam 1 from the apparatus 3.

Figure 3A:
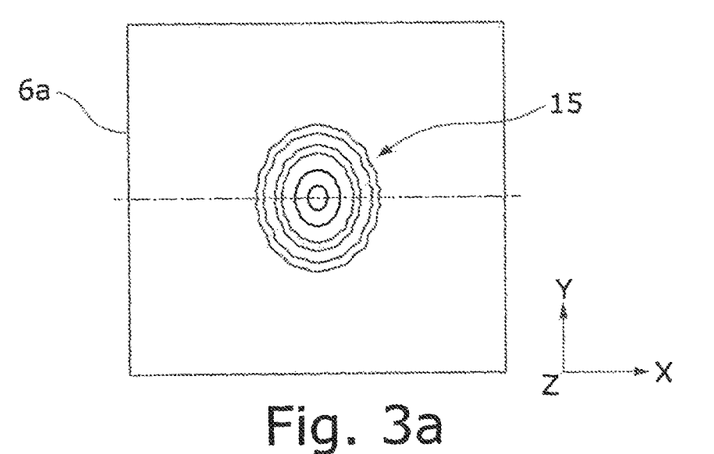
Figure 3B:
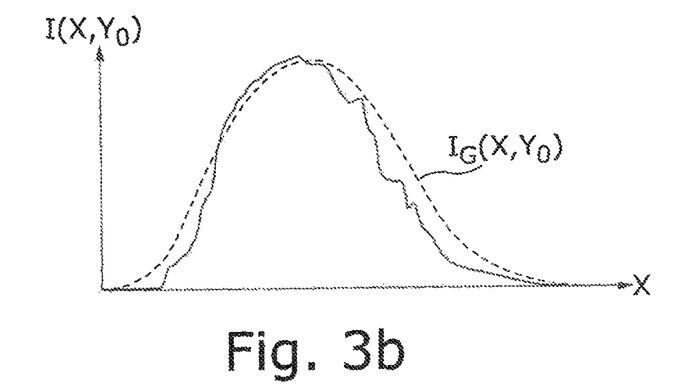
FIG. 3b shows a one-dimensional section through the intensity distribution of FIG. 3a and a Gaussian intensity distribution.

FIG. 3a shows a beam profile 15 of the laser beam 1 on a detector area of the detector 6a of FIG. 1, i.e., in a plane perpendicular to the propagation direction z of the laser beam 1. In the illustration of FIG. 3a, the beam profile 15 is represented by lines of constant intensity of an intensity distribution I(x, y) of the laser beam 1, which is measured in spatially resolved fashion by the detector 6a in the form of a camera. FIG. 3b shows a one-dimensional section through the intensity distribution I(x, y) along a line in the center of the detector area (i.e., at $y_0=0$), said line extending along an X-direction and being illustrated in dash-dotted fashion in FIG. 3a. As can be identified in FIG. 3b, the intensity distribution I(x, $y_0$) has an irregular profile and deviates from a (radially symmetrical) Gaussian distribution $I_G$(x, y), a one-dimensional section of which in the X-direction $I_G$(x, $y_0$) is likewise illustrated in FIG. 3b ($y_0=0$).

The two-dimensional Gaussian intensity distribution $I_G$(x, y) can be described by the following formula:

$$I_G(x, y) = I_0 \, \text{EXP}([(x - x_0)2 + (y - y_0)^2]/(2w_0^2)), \tag{1}$$

where $I_0$, $x_0$, $y_0$, $w_0$ form the parameters of the Gaussian intensity distribution $I_G$(x, y).

To a first approximation, the parameters $x_0$ and $y_0$ can be identified as the center of the detector area ($x_0=y_0=0$). The parameters $I_0$ and $w_0$ can also be specified, for example by virtue of the detector 6a being irradiated by a laser beam 1 with a Gaussian beam profile for calibration purposes.

The deviation D of the detected two-dimensional intensity distribution I(x, y) from the Gaussian intensity distribution $I_G$(x, y) can be expressed, for example, by the following error integral or functional:

$$D = \int\int_{x,y} (I(x, y) - I_G(x, y))^2, \tag{2}$$

where $I_G$(x, y) is parameterized as an equation (1).

The following procedure can be carried out for adjusting the laser beam 1 on the basis of the beam profile 15, shown in FIG. 3a, on the detector 6a:

Initially, the laser beam 1 passes through the beam-shaping device 4 and the beam profile 15 in the form of the intensity distribution I(x, y) is measured with the aid of the detector 6a. In a subsequent step, the beam quality property in the form of the deviation D is determined on the basis of the intensity distribution I(x, y) and on the basis of equations (1) and (2). A check is carried out as to whether the deviation D has reached a predetermined value $D_S$, which corresponds to the adjustment target.

Should this not be the case, an adjustment step, in which the adjustable optical unit 5 is altered, is carried out, for example by virtue of the second lens 11b in FIG. 1 being displaced to the right. The decision as to how the adjustable optical unit 5 is altered is determined by an optimization algorithm on the basis of the determined deviation D, more precisely the respectively determined value of the deviation D, and optionally on the basis of the deviation D determined in the respective preceding adjustment steps.

In a subsequent step, the deviation D and hence the effect of the alteration of the adjustable optical unit 5 on the beam quality is determined anew. Once adjustment target has been reached, i.e., once the deviation D is less than the specified value $D_S$, the adjustment is terminated. Should this not be the case, another decision as to how the adjustable optical unit 5 should be altered is made by the optimization algorithm on the basis of the value of the deviation D (and on the basis of the deviation determined in the preceding adjustment step). Should the deviation D have increased in the last alteration of the adjustable optical unit 5, an opposing alteration can be implemented, e.g., a displacement of the second lens 11b of the adjustable optical unit 5 of FIG. 1 to the left, in order to reduce the deviation D. The selection of the direction and absolute value of the displacement of the second lens 11b is made by the optimization algorithm in this case, the latter minimizing the deviation D iteratively and terminating the adjustment once the adjustment target has been reached, i.e., once the deviation D reaches the specified value $D_S$.

The steps of the above-described method, in particular the optimization algorithm, can be carried out in the evaluation device 7. By way of example, the evaluation device 7 can be implemented in the form of suitable software and/or hardware (e.g., control computer). When determining the deviation D as per equation (1), at least one of the parameters $I_0$, $x_0$, $y_0$, $w_0$ of the Gaussian intensity distribution $I_G$(x, y) can be varied in order to minimize the deviation D from the respectively measured intensity distribution I(x, y); however, this is not mandatory.

The beam quality property in the form of the deviation D, described in conjunction with FIGS. 3a,b, is a particularly simple criterion for the beam quality of the laser beam 1, which can be determined without great outlay.

Alternatively, a deviation of a beam profile 16 of the laser beam 1 from a specified beam profile, in particular from a Gaussian beam profile, in the propagation direction z in the form of a beam caustic can be determined as beam quality property, as illustrated in FIG. 2. In this case, the beam caustic of the laser beam 1 is measured by virtue of the intensity distribution I (x, y) or the beam diameter of the laser beam 1 is measured in a plurality of planes that are offset from one another in the propagation direction z. For the caustic measurement, the detector 6a shown in FIG. 2 can be displaced by means of a motor drive along a suitable guide, as indicated by a double-headed arrow. The beam caustic 16 of the laser beam 1 can be used to determine, in a manner known per se, the $M^2$ value of the laser beam, i.e., the ratio between the divergence angle $\varphi$ of the laser beam and the divergence angle $\varphi_G$ of an ideal Gaussian beam with the same diameter at the beam waist, i.e., $M^2=\varphi/\varphi_G$. The beam parameter product $BPP=M^2\lambda/\pi$ can also be determined in this way (and on the basis of the known laser wavelength $\lambda$ of the laser beam 1). In the ideal case, there can be an ISO-conform caustic measurement of the laser beam 1. The adjustment of the laser beam 1, or the optimization, can be implemented analogously to what was described above for the deviation D, i.e., the beam parameter product BPP or the M squared parameter $M^2$ are reduced or minimized until these reach a predetermined value BPPs and $M_S^2$, respectively.

Figure 4:
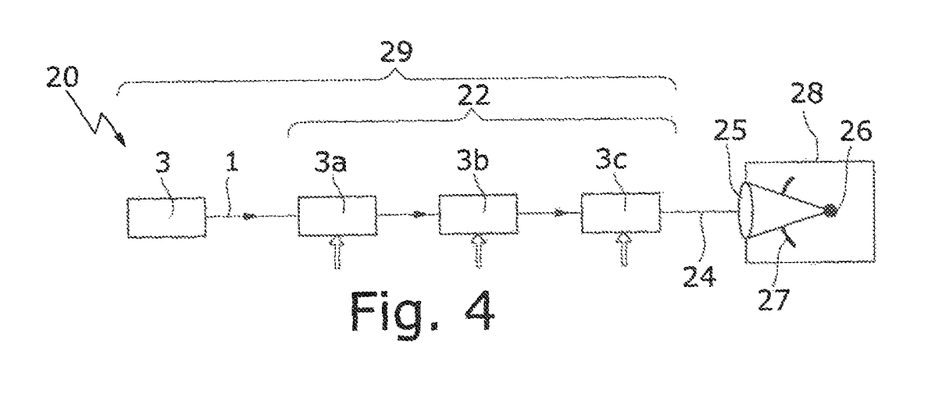
FIG. 4 shows an illustration of an EUV radiation generation apparatus, which has an apparatus as per FIG. 1 and an apparatus as per FIG. 2.

FIG. 4 shows an optical arrangement in the form of an EUV radiation generation apparatus 20, which has a seed laser source 3 for providing or generating an (adjusted) laser beam 1, which is embodied like the apparatus 3 illustrated in FIG. 2. In the shown example, the laser beam 1 is a $CO_2$ laser beam, which is generated by means of a gaseous laser active medium 2 (cf. FIG. 2). The EUV radiation generation apparatus 20 comprises, in addition to the seed laser source 3, an amplifier arrangement 22 having three optical amplifiers or amplifier stages 3a, 3b, 3c, a beam guiding device 24, not illustrated in more detail, and a focusing device 25. The focusing device 25 is used to focus the laser beam 1, which is generated by the seed laser source 3 and amplified by the amplifier arrangement 22, at a target region in a vacuum chamber 28, in which a target material 26 is introduced. Upon irradiation with the laser beam 1, the target material 26 transitions into a plasma state and here emits EUV radiation, which is focused using a collector mirror 27. Together with the amplifier arrangement 22, the seed laser source 3 forms a driver laser arrangement 29 of the EUV radiation generation apparatus 20.

In the EUV radiation generation apparatus 20 shown in FIG. 4, the first amplifier stage 3a is embodied like the apparatus 3a shown in FIG. 1; i.e., the first amplifier stage 3a facilitates an automated adjustment of the laser beam 1. This is advantageous since, following a repair of the first amplifier stage 3a, only the first amplifier stage 3a has to be adjusted as described above, without an adjustment of the subsequent amplifier stages 3b, 3c being required. It is understood that, optionally, the second and third amplifier stage 3b, 3c can also be embodied in the manner shown in FIG. 1. Other beam shaping devices 4 than the optical amplifier described in FIG. 1 or the electro-optic modulator described in FIG. 2 can also be adjusted as described further above, for example optical isolators, optical (multi-pass) retardation sections, optical polarizers, etc., which could likewise be provided in the EUV radiation generation apparatus 20 or in any other optical arrangement.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for adjusting a laser beam, the method comprising:
    following passage of the laser beam through a beam-shaping device, measuring, via a detector of a detector device, a beam profile of the laser beam,
    determining a beam quality property of the laser beam based on the measured beam profile, wherein the beam quality property comprises a deviation of an intensity distribution of the laser beam on the detector from a specified intensity distribution, and
    altering an adjustable optical unit for modifying at least one property of the laser beam prior to the entry into the beam-shaping device,
    wherein, for adjusting the laser beam, the adjustable optical unit is altered based on the deviation of the intensity distribution of the laser beam on the detector from the specified intensity distribution.

2. The method as claimed in claim 1, wherein the beam quality property is maximized or minimized during the adjustment of the laser beam.

3. The method as claimed in claim 1, wherein the specified intensity distribution is a Gaussian intensity distribution.

4. The method as claimed in claim 1, further comprising varying at least one parameter of the specified intensity distribution when determining the deviation.

5. The method as claimed in claim 1, wherein a beam parameter product or an M squared parameter is determined as the beam quality property.

6. The method as claimed in claim 1, wherein a beam position of the laser beam, an alignment of the laser beam, a caustic of the laser beam and/or an imaging aberration of the laser beam are set when altering the adjustable optical unit.

7. The method as claimed in claim 1, wherein at least one optical element of the adjustable optical unit is altered when adjusting the laser beam.

8. The method as claimed in claim 1, wherein the beam-shaping device is selected from the group consisting of: an optical amplifier, an optical isolator, an optical modulator, an optical retardation section, and an optical polarizer.

9. The method as claimed in claim 1, wherein the beam-shaping device and the adjustable optical unit are disposed in a laser resonator.

10. The method as claimed in claim 1, wherein the laser beam is aligned on the detector during the adjustment or wherein a power portion of the laser beam is permanently steered onto the detector.

11. An apparatus for providing an adjusted laser beam, the apparatus comprising:
    a beam-shaping device,
    a detector device comprising a detector configured to measure a beam profile of the laser beam following passage of the laser beam through the beam-shaping device,
    an evaluation device configured to determine a beam quality property of the laser beam based on the measured beam profile, wherein the beam quality property of the laser beam comprises a deviation of an intensity distribution of the laser beam on the detector from a specified intensity distribution, and
    an adjustable optical unit configured to modify at least one property of the laser beam prior to entry of the laser beam into the beam-shaping device,
    wherein, for adjusting the laser beam, the evaluation device is embodied to alter the adjustable optical unit based on the deviation of the intensity distribution of the laser beam on the detector from the specified intensity distribution.

12. The apparatus as claimed in claim 11, wherein the beam-shaping device is selected from the group consisting of: optical amplifier, optical isolator, optical modulator, optical polarizer and optical retardation section.

13. The apparatus as claimed in claim 11, wherein the adjustable optical unit has at least one alterable optical element configured to modify the at least one property of the laser beam.

14. The apparatus as claimed in claim 11, wherein the beam-shaping device and the adjustable optical unit are disposed in a laser resonator.

15. The apparatus as claimed in claim 11, further comprising:
    a switchable optical element configured to align the laser beam on the detector during the adjustment and/or
    a beam splitter device configured to steer a power portion of the laser beam onto the detector.

16. The apparatus as claimed in claim 11, wherein the specified intensity distribution is a Gaussian intensity distribution.

17. An optical arrangement, comprising:
    at least two apparatuses as claimed in claim 11.

18. The optical arrangement as claimed in claim 17, wherein the at least two apparatuses are disposed in succession in the beam path of the laser beam.

* * * * *